United States Patent Office 3,146,065
Patented Aug. 25, 1964

3,146,065
PRODUCTION OF BERYLLIUM CHLORIDE FROM BERYL ORE
Ricardo O. Bach, Gastonia, N.C., assignor to Beryllium Metals and Chemical Corporation, Cambridge, Mass., a corporation of Delaware
No Drawing. Filed Nov. 22, 1961, Ser. No. 154,339
9 Claims. (Cl. 23—87)

The present invention relates to extraction processes involving beryllium ore and, more particularly, to the production from beryl of beryllium chloride, from which beryllium metal may be reduced.

The most common beryllium ore is beryl, $$3BeO.Al_2O_3.6SiO_2$$

a relatively inert mineral that can be chemically attacked only at elevated temperatures. This mineral contains beryllium and aluminum compounds which, although chemically similar, must be separated if beryllium is to be derived. In the so-called Copaux process ("Methode de traitment du beryl pour en extraire la Glucine," Comptes Rendus, Acad. Sci., Paris, vol. 168, May 24, 1919, p. 610), beryl is reacted with sodium silicofluoride (in the presence of other compounds if desired) at elevated temperature to produce reaction products including a beryllium fluoride complex, which may be isolated by leaching with water. In a modification of this process (R. A. Opatowski, U.S. Patent No. 2,209,131, July 23, 1940), the following reaction occurs:

$$3BeO.Al_2O_3.6SiO_2 + 2Na_2SiF_6 + Na_2CO_3$$
$$\rightarrow 3Na_2BeF_4 + Al_2O_3 + 8SiO_2 + CO_2$$

Fluorination also can be achieved by the interaction of $SiF_4$ with the ore in the presence of an alkali or alkaline earth fluoride, according to the following reaction:

$$3BeO.Al_2O_3.6SiO_2 + 1\tfrac{1}{2}SiF_4 \xrightarrow{MF, MF_2} 3BeF_2 + Al_2O_3 + 7\tfrac{1}{2}SiO_2$$

In the conventional Copaux process, the sinter is leached with water, yielding solutions containing up to 14 grams per liter of BeO.

The object of the present invention is the separation of beryllium from a reaction product of the foregoing type by a simplified technique of unprecedented efficiency. In the conventional method an aqueous fluoride containing beryllium solution is precipitated to obtain first the hydroxide, next the oxide and then the chloride by chlorination with carbon and chlorine. In contrast the method of the present invention derives anhydrous $BeCl_2$ in one step directly from the $BeF_2$ containing sinter. In particular, it has been found that silicon chloride, $SiCl_4$, selectively reacts with the beryllium fluoride complex to produce high purity beryllium chloride, $BeCl_2$, according to the reaction:

$$BeF_2(MF,MF_2) + \tfrac{1}{2}SiCl_4 \rightarrow BeCl_2(+MCl,MCl_2) + \tfrac{1}{2}SiF_4$$

where M is an alkali or alkaline earth metal, other than beryllium, which is also converted to the chloride but does not volatilize at the temperature at which this reaction is carried out. The $BeCl_2$, which is volatile at elevated temperature, may be isolated readily from the remainder of the reaction product.

Other objects of the present invention will in part be obvious and will in part appear hereinafter. For a fuller understanding of the nature and objects of the present invention, reference is to be made to the following detailed disclosure.

Generally, the illustrated process in accordance with the present invention comprises the steps of comminuting beryl ore to powder, mixing this powder with a fluorinating reagent and water to produce a paste, forming the paste into briquettes, sintering the briquettes to effect a Copaux reaction, comminuting the briquettes to powder, subjecting this powder to a chlorinating reagent to produce gaseous beryllium chloride, isolating the gaseous beryllium chloride and reducing beryllium therefrom.

Preferably, the beryl ore powder is such that no more than 10% by weight is coarser than 100 mesh. The fluorinating reagent usually is sodium silicofluoride. The paste from which the Copaux briquettes are formed contains by total weight: from 45 to 65% beryl ore containing from 11 to 14% beryllium oxide; from 25 to 55% sodium fluorosilicate; from 0 to 10% sodium carbonate; and sufficient water to make the paste. The Copaux reaction briquettes, 90% by weight of which range in maximum diameter from 1 cm. to 4 in., are sintered at a temperature ranging from 600° to 820° C. for a period ranging from ½ to 6 hrs. The sinter is then coarsely ground, not more than 10% being coarser than 100 mesh.

Preferably, the chlorinating reagent is a gaseous chloride of an element selected from Groups III and IV of the periodic table, for example, $BCl_3$, $CCl_4$, $COCl_2$, $SiCl_4$, $TiCl_4$ and $ZrCl_4$. This gaseous chloride when applied is mixed with an inert gas, for example, nitrogen or a noble gas such as argon. The chlorination preferably is effected at a temperature above the boiling point of the chloride, say above 500° C., and below 800° C. to limit corrosive action.

The following non-limiting examples will further illustrate the present invention.

*Example I*

An Opatowski reaction (supra) was effected with beryl ore, sodium silicofluoride and sodium carbonate, in the following proportions by weight 10:7:2. This sinter contained 6.28% available beryllium, i.e., water soluble beryllium expressed as BeO. 500 parts of this material was placed in a vycor tube and heated to 570° C. It was held for two hours and 10 minutes at this temperature in a stream of argon, saturated with $SiCl_4$ at room temperature. In the cold zone of the tube, solid white material collected. In the temperature gradient between the cold zone and the hot zone, droplets of fused $BeCl_2$ were visible. After letting the tube cool to room temperature in a stream of argon, the remaining fluorinated material was removed. The tube was then washed out, whereby the white condensate dissolved with considerable heat of solution. This wash solution contained 27.4 parts of BeO, corresponding to 87.2% of the available beryllium. The chlorine content corresponded to the ratio 1 Be:2 Cl.

*Example II*

The sinter of Example I was treated as follows: A slow heating in an argon-$SiCl_4$ atmosphere (from room temperature to 420° C. in 1 hr.) was followed by a 30 min. treatment at 580° C. 49% of the available beryllium was found as chloride sublimate, whereas 30% remained in the residual sinter as available beryllium.

*Example III*

One gm. of finely ground 12.8% BeO containing beryl ore was mixed with 1 gm. of LiF and placed in a vycor tube within a tubular furnace. At 800° C., it was exposed to $SiF_4$ gas for 35 min. 66% of the BeO was found to be in the available form. This material was exposed as in Examples I and II to yield $BeCl_2$.

The present invention provides the following advantages. Practically only the beryllium containing part of the ore is chlorinated, easing the demands of separative purification of the sublimate. Inasmuch as only the beryllium containing part of the ore consumes chlorinating reagent, the economy of consumption is better than in other prior methods. The temperatures in both phases of this process are well below the minimum temperature required for prior methods so that corrosive action is limited.

Since certain changes may be made in the foregoing disclosure without departing from the scope of the invention herein involved, it is intended that all matter herein be interpreted in an illustrative rather than a limiting manner.

What is claimed is:

1. The process comprising the steps of fluorinating beryl ore in order to provide a first reaction product containing a beryllium fluoride complex, chlorinating the first reaction product in order to produce a second reaction product containing beryllium chloride and a remainder at a temperature at which said remainder of said second reaction product remains solid, and vaporizing said beryllium chloride at a temperature at which said remainder of said second reaction product remains solid in order to remove said beryllium chloride therefrom.

2. The process of claim 1 wherein said step of fluorinating is effected by reaction with sodium silicofluoride.

3. The process of claim 1 wherein said step of chlorinating is effected by reaction with a chloride of an element selected from Groups III and IV of the periodic table.

4. The process of claim 1 wherein said step of chlorinating is effected by reaction with $SiCl_4$.

5. The process of claim 4 wherein said reaction occurs in the presence of an inert gas.

6. In an extraction process involving the step of fluorinating beryl ore in order to provide a reaction product containing a beryllium fluoride complex, the further steps of reacting a gaseous reagent, selected from the class consisting of $BCl_3$, $CCl_4$, $COCl_2$, $SiCl_4$, $TiCl_4$ and $ZrCl_4$, with said reaction product at a temperature ranging between 500 and 800° C. in order to produce a reaction product including beryllium chloride and a remainder, said remainder being solid, said beryllium chloride being in the gaseous state, and isolating said beryllium chloride in the gaseous state from said remainder.

7. In an extraction process, the steps of comminuting beryl ore containing 11 to 14% beryllium oxide to a powder, no more than 10% by total weight of said powder being coarser than 100 mesh, forming a paste containing by total weight from 45 to 65% of said powder, from 25 to 55% sodium fluorosilicate, from 0 to 10% sodium carbonate and sufficient water to make said paste, forming said paste into briquettes, 90% by weight of which range in maximum diameter from 1 cm. to 4 in., sintering said briquettes at a temperature ranging from 600 to 820° for a period ranging from ½ to 6 hours, grinding said briquettes to a powder, no more than 10% of said powder being coarser than 100 mesh, reacting, at a temperature ranging from 500 to 800° C., said last-mentioned powder with a mixture of an inert gas and a reagent selected from the class consisting of $BCl_3$, $CCl_4$, $COCl_2$, $SiCl_4$, $TiCl_4$ and $ZrCl_4$, to produce gaseous beryllium chloride and a solid residue, and isolating said gaseous beryllium chloride from said solid residue.

8. The extraction process of claim 7 wherein said paste contains said beryl ore, said sodium silicofluoride and said sodium carbonate in the proportions 10:7:2, said reagent being $SiCl_4$, said reacting of said last-mentioned powder and said mixture being effected at approximately 570° C. for a period of approximately two hours, said mixture being supplied as a gas stream.

9. The extraction process of claim 7 wherein said last-mentioned powder is heated in an inert gas-$SiCl_4$ atmosphere from room temperature to approximately 420° C. in approximately 1 hour and then is heated for approximately 30 minutes at approximately 580° C.

References Cited in the file of this patent

UNITED STATES PATENTS

| | | |
|---|---|---|
| 1,893,331 | Kangro et al. | Jan. 3, 1933 |
| 2,209,131 | Opatowski | July 23, 1940 |
| 2,867,501 | Hanley | Jan. 6, 1959 |

FOREIGN PATENTS

| | | |
|---|---|---|
| 728,964 | Germany | Dec. 8, 1942 |